June 26, 1923.  
T. NAGEL  
1,459,923  
METHOD OF AND APPARATUS FOR TREATING MATERIAL WITH GAS  
Filed April 26, 1922
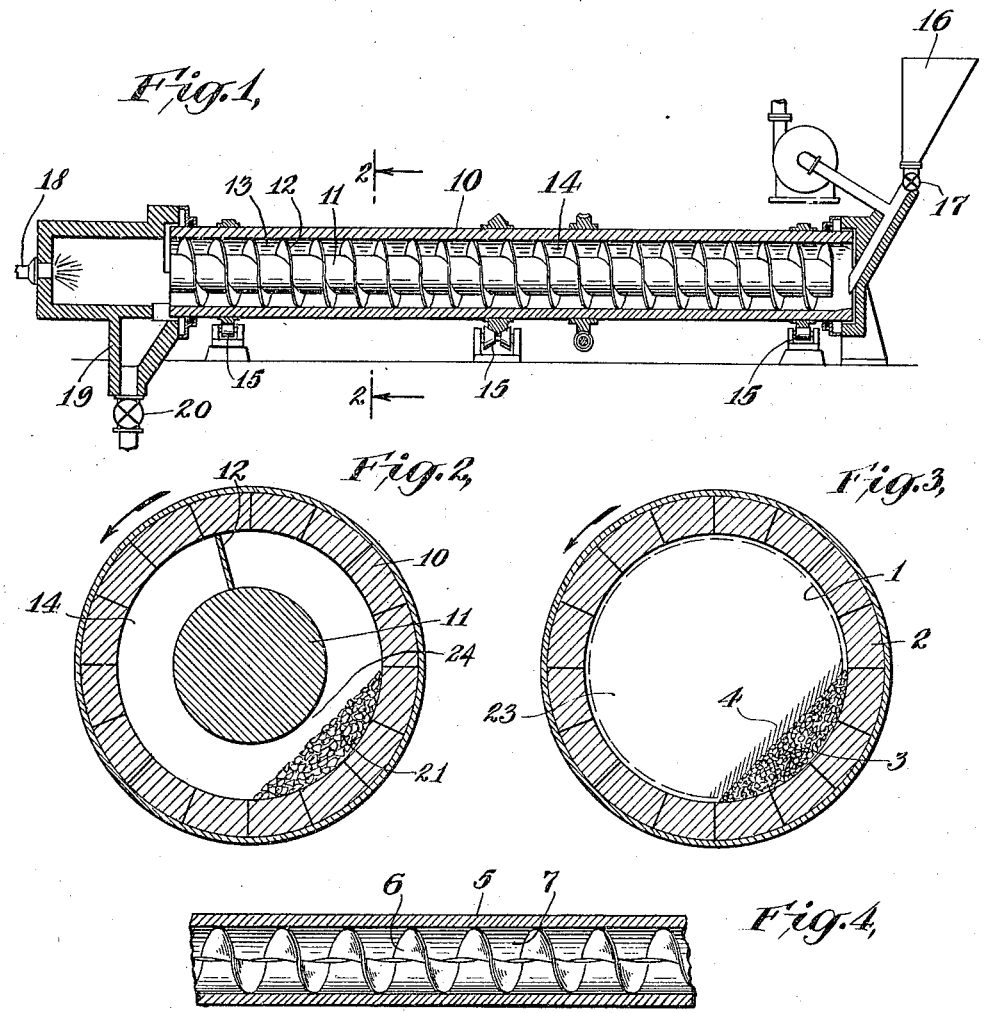
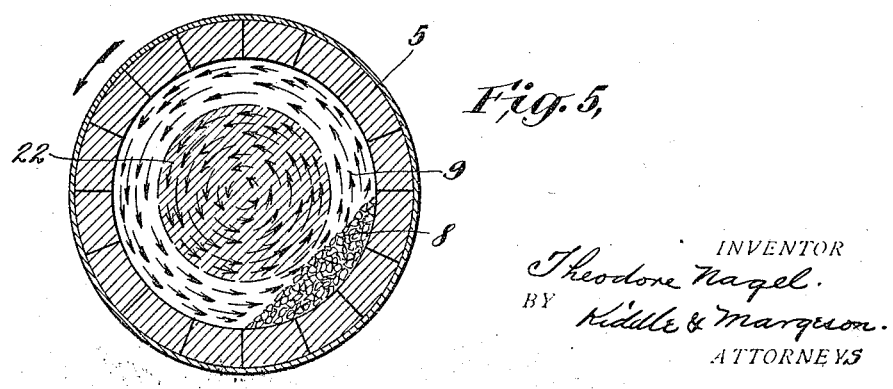
INVENTOR  
Theodore Nagel.  
BY Kiddle & Margeson.  
ATTORNEYS Patented June 26, 1923.

1,459,923

UNITED STATES PATENT OFFICE.

THEODORE NAGEL, OF BROOKLYN, NEW YORK.

METHOD OF AND APPARATUS FOR TREATING MATERIAL WITH GAS.

Application filed April 26, 1922. Serial No. 556,810.

*To all whom it may concern:*

Be it known that I, THEODORE NAGEL, a citizen of the United States, and a resident of the borough of Brooklyn, county of Kings, and city and State of New York, have invented certain new and useful Improvements in Methods of and Apparatus for Treating Material with Gas, of which the following is a specification.

My invention relates to a method of and apparatus for treating material with a gas wherein a charge of the material and a gas are continuously fed in opposed directions through a rotating cylindrical shell or chamber.

An object of the invention is the provision of a method and apparatus whereby substantially all of the gas in traversing the chamber will be brought into contact with the charge.

A further object of my invention is to provide a method and apparatus wherein the charge will be agitated during treatment so as to present continuously changing exposed surfaces and wherein the gas is so controlled as to direction that substantially all of the gas is passed into contact with the charge and substantially all of the particles of the charge are brought into contact with the flowing gas.

Specifically my invention comprises a rotatable cylindrical shell having a central core spaced from the walls of the shell and occupying or filling a space about the central longitudinal axis thereof, the space between the periphery of the core and the wall of the shell being provided with a helical member surrounding the core. This construction enables me to continuously advance a charge of material through the shell while the charge is being constantly agitated, a practically uniform helical annular motion being imparted to the gas passing through the shell in the opposite direction, thereby, as I have above pointed out, forcing substantially all of the gas at each revolution of the gas to contact with the charge and to present every particle of the charge to the gas during the passage of the charge through the shell.

In the accompanying drawings,—

Fig. 1 illustrates in sectional elevation an embodiment of my invention;

Fig. 2 is a section through Fig. 1, on the line 2—2;

Fig. 3 illustrates in section a form of apparatus on which my invention is an improvement;

Fig. 4 is a longitudinal section through another form of apparatus; and

Fig. 5 is a section through an apparatus such as shown in Fig. 4.

In order that my invention may be clearly understood I will describe the same in connection with the reduction of metallic oxids, without limiting myself to the treatment of such materials, however, and I will point out briefly the difficulty experienced in present-day practice and which I have overcome by the present invention.

Usually a rotary furnace is employed the furnace being slightly tilted downwardly in the direction of advancement of the charge in order to effect the desired forward translation of the charge, and a reducing gas is passed through the furnace in a direction opposed to the advance of the charge. However, as I have illustrated in Fig. 3, only a small percentage of the reducing gas comes into contact with the surface of the charge owing to the fact that the gas is free to flow through the furnace parallel to the central axis thereof, the confining walls, so to speak, for the gas being the surface of the charge and that portion of the inside of the furnace not covered by the charge as shown by the dotted line 1 of Fig. 3.

Referring to this figure, 2 designates a rotatable cylindrical shell tilted downwardly in the direction of advancement of the charge and 3 a charge of material passing therethrough. In such a device the relative proportion of the gas which comes into contact with the surface of the charge to the gas passing through the free area which does not come into contact with the surface of the charge is represented by the shaded area designated 4 and the unshaded area designated 23 respectively in Fig. 3, and the distance the gas has to travel is merely the length of the shell 2.

To overcome the necessity of tilting the shell an apparatus similar to that illustrated in Fig. 4 has been proposed, this apparatus comprising a cylindrical shell 5 set on a horizontal and provided on its interior with a continuous helical or spiral wall 6 such as would be formed by twisting a ribbon spirally around the central axis of the cylinder 5 while maintaining the width of the ribbon always at right angles to this axis. Such an arrangement provides a continuous spiral passage 7 extending lengthwise or longitudinally of the shell 5 and hence rotation of the shell will cause the charge 8 of Fig. 5 to be translated forward. The gas in such an apparatus passes through the shell in a whirling motion about the central axis of the furnace. If the pitch or distance between each succeeding spiral wall be equal to the diameter of the inside of the furnace then the mean average distance travelled by all of the gas to pass through the furnace is about one and one-half times the length of the furnace. This distance would be increased to about three times the length of the furnace if the pitch between the spiral walls be equal to the radius of the inside of the furnace.

The motion of the gas passing through such an apparatus is diagrammatically illustrated in Fig. 5 from which it will be seen that while some of the gas is passed into contact with the charge 8 a large proportion of the gas, however, has a free spiral passage through the furnace and hence is not forced to impinge against the surface of the charge at all. The relative proportion of the gas contacting with the surface of the charge to that proportion of the gas which is not forced to contact with the surface of the charge is shown by the areas represented by the unshaded annulus designated 9 and the shaded circle designated 22 respectively in Fig. 5.

It will be seen therefore that the efficiency of the devices of Figs. 3, 4 and 5 is very low due to the fact that a large proportion of the gas passing through the shell is not forced to contact with the surface of the charge.

In my improved construction I provide a rotatable shell or chamber 10 within which I provide a cylindrical core 11 extending longitudinally of the shell and surrounding the central axis of the shell. In other words, this core occupies the space designated 22 in Fig. 5 and prevents a flow of gas through this space. Surrounding this core I provide a helix 12 occupying the space 13 between the inner wall of the shell or chamber 10 and the periphery of the core 11, the pitch of this helix being such as to form a continuous free or open helical circular path 14 as seen in Fig. 2. The shell 10 is conveniently mounted for rotation on rollers 15, the entire apparatus which may be driven in any suitable manner rotating as a unit. The charge of material may be fed in to the furnace from a hopper 16 which is provided with a valve 17, the charge advancing through the shell from right to left as viewed in Fig. 1. At the left hand end of the shell I provide means 18 for supplying a continuous flow of gas which travels through the shell from left to right as viewed in Fig. 1. The discharge of treated material from the shell is accomplished by a discharge chute 19 controlled by sealing valve 20.

It will be apparent from the foregoing that with a gas being fed continuously through my improved apparatus in a direction opposed to the direction of travel or continuous advance of the charge the gas will be caused to take a practically uniform helical annular path through the passage 14 so as to force substantially all of the gas during each helical advancement or revolution of the gas to contact with the surface of the charge 21 due to the fact as above pointed out, that the free space designated 22 in Fig. 5 is occupied by the core 11.

It will be apparent also that in translating the charge forward due to the helix 12 in cooperation with the rotation of the shell 10 the surface of the charge will be constantly changing on account of the rotation of the shell 10 so that not only is all or substantially all of the gas passed into contact with the charge by reason of the presence of the core 11 and helix 12 but substantially all of the particles of the charge are brought into contact with the gas inasmuch as all the particles are brought to the surface while the charge is passing through the apparatus. In this way it is obvious that I very materially increase the efficiency of the apparatus over an apparatus of the types such as diagrammatically illustrated in Figs. 4 and 5. This will be clearly seen from a comparison of Fig. 5 with Fig. 2, the gas shown in the space 22 of Fig. 5 being practically wasted.

My invention possesses a further advantage over present devices in that the free space 24 between the periphery or surface of the core 11 and the surface of the charge 21 may be regulated so as to give to the volume of gas circulating through the shell the desired velocity required for the gas while in contact with the surface of the charge.

It will be apparent also that by providing the core 11 as well as the helix 12 the velocity of impact of the gas upon the charge is increased, thereby increasing the rate of heat transfer from the gas to the charge for the same time period of contact as compared with devices such as illustrated in Figs. 3 and 5.

I claim:

1. The method which consists in advancing a charge of material and a gas through a chamber horizontally and in opposite directions, all of the gas at all times during its passage through the chamber flowing in practically a uniform helical, annular path, to force substantially all of the gas during each helical advancement thereof to contact with the charge and to present every particle of the charge to the gas during its passage through the chamber.

2. In an apparatus of the class described, a cylindrical member or shell, a cylindrical member within said shell extending longitudinally thereof and spaced from the walls thereof and a helical member within the space between the shell and said cylindrical member, said cylindrical members and said helical member being rotatable as a unit.

3. In an apparatus of the class described, the combination of a shell, an imperforate core or cylinder extending longitudinally of the shell and occupying the space around the central axis thereof and a continuous helical wall occupying the space between the interior of the shell and said core, said shell, core and helix being rotatable as a unit, said apparatus being provided with a gas inlet and a material inlet whereby gas and a charge of material may pass through the apparatus in opposed directions, said shell in cooperation with said helix translating the charge forward while the surface of the charge is constantly changing, the core and helix cooperating to force substantially all of the gas to contact with the charge.

4. In an apparatus of the class described, a cylindrical member or shell, a cylindrical member within said shell extending longitudinally thereof and spaced from the walls thereof, and a helical member within the space between the said shell and cylindrical member, said shell and helix being rotatable as a unit.

This specification signed this 22d day of April, 1922.

THEODORE NAGEL.